(12) United States Patent
Arkko

(10) Patent No.: US 11,343,675 B2
(45) Date of Patent: May 24, 2022

(54) COMMUNICATION DEVICE AUTHENTICATION FOR MULTIPLE COMMUNICATION DEVICES

(71) Applicant: Telefonaktiebolaget LM Ericsson (publ), Stockholm (SE)

(72) Inventor: Jari Arkko, Kauniainen (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/761,516

(22) PCT Filed: Nov. 21, 2017

(86) PCT No.: PCT/EP2017/079975
§ 371 (c)(1),
(2) Date: May 5, 2020

(87) PCT Pub. No.: WO2019/101301
PCT Pub. Date: May 31, 2019

(65) Prior Publication Data
US 2020/0267549 A1  Aug. 20, 2020

(51) Int. Cl.
*H04W 12/06* (2021.01)
*H04L 29/06* (2006.01)
(Continued)

(52) U.S. Cl.
CPC ......... *H04W 12/06* (2013.01); *H04L 63/0853* (2013.01); *H04W 12/04* (2013.01); *H04W 12/35* (2021.01)

(58) Field of Classification Search
CPC ............ G06F 21/602; H04N 21/25816; H04L 63/0853
(Continued)

(56) References Cited

U.S. PATENT DOCUMENTS

2007/0091843 A1  4/2007 Patel et al.
2008/0072047 A1*  3/2008 Sarikaya ............ H04L 63/0869
713/171
(Continued)

FOREIGN PATENT DOCUMENTS

WO  2015157933 A1  10/2015
WO  2016162502 A1  10/2016
(Continued)

OTHER PUBLICATIONS

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V15.0.0, Dec. 1, 2017, pp. 1-181, 3GPP.
(Continued)

*Primary Examiner* — Kiet M Doan
(74) *Attorney, Agent, or Firm* — Coats & Bennett, PLLC

(57) ABSTRACT

Disclosed is a method in an operator authentication server for authentication of a communication device associated with a communication device manager. The communication device manager being associated with a plurality of communication devices, wherein the operator authentication server has transmitted group subscriber identity module (SIM) information to the communication device manager, wherein the group SIM information is associated with an international mobile subscriber identity (IMSI) number and a shared secret K. The method comprises receiving from the communication device a request for authentication comprising a sub identifier associated with the communication device; determining whether the sub identifier is known. Wherein if it is determined that the sub identifier is known, the method comprises: deriving a secret Ki associated with the communication device based on the shared secret K, and the sub identifier; transmitting a challenge to the commu-
(Continued)

nication device, wherein the challenge is formed cryptographically based on the derived secret Ki; receiving from the communication device a response to the challenge, wherein the response is cryptographically formed based on the derived secret Ki; determining whether the received response is correct by confirming that it was cryptographically formed by using the derived secret Ki. When it is determined that the received response is correct, the method comprises: authenticating the communication device and derive a first session key based on the derived secret Ki.

10 Claims, 4 Drawing Sheets

(51) Int. Cl.
  *H04W 12/04* (2021.01)
  *H04W 12/30* (2021.01)
(58) Field of Classification Search
  USPC .............................................. 455/404.2, 411
  See application file for complete search history.

(56) References Cited

U.S. PATENT DOCUMENTS

| | | | |
|---|---|---|---|
| 2015/0208234 A1 | 7/2015 | Mohajeri | |
| 2017/0034644 A1 | 2/2017 | Chennakeshu | |
| 2017/0323116 A1 | 11/2017 | Mumford et al. | |
| 2019/0246272 A1* | 8/2019 | Richard | H04L 9/3242 |

FOREIGN PATENT DOCUMENTS

| | | |
|---|---|---|
| WO | 2017001022 A1 | 1/2017 |
| WO | 2017059579 A1 | 4/2017 |

OTHER PUBLICATIONS

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V1.0.0, Jun. 1, 2017, pp. 1-146, 3GPP.

3rd Generation Partnership Project, "3rd Generation Partnership Project; Technical Specification Group Services and System Aspects; Procedures for the 5G System; Stage 2 (Release 15)", Technical Specification, 3GPP TS 23.502 V15.0.0, Dec. 1, 2017, pp. 1-258, 3GPP.

3rd Generation Partnership Project, "3rd Generation Partnership Project; Technical Specification Group Services and System Aspects; Procedures for the 5G System; Stage 2 (Release 15)", Technical Specification, 3GPP TS 23.502 V0.4.0, May 1, 2017, pp. 1-126, 3GPP.

3rd Generation Partnership Project, "3rd Generation Partnership Project; Technical Specification Group Services and System Aspects; 3GPP System Architecture Evolution (SAE); Security Architecture (Release 15)", Technical Specification, 3GPP TS 33.401 V15.2.0, Jan. 1, 2018, pp. 1-163, 3GPP.

Arkko, J. et al., "Improved Extensible Authentication Protocol Method for 3rd Generation Authentication and Key Agreement (EAP-AKA')", Network Working Group, May 1, 2009, pp. 1 29, RFC 5448, 3GPP.

Wikipedia, "Extensible Authentication Protocol", Mar. 12, 2020, pp. 1-11, retrieved on Apr. 21, 2020, retrieved from internet: https://en.wikipedia.org/wiki/Extensible_Authentication_Protocol.

Arkko, J. et al., "Perfect-Forward Secrecy for the Extensible Authentication Protocol Method for Authentication and Key Agreement (EAP-AKA' PFS) draft-arkko-eap-aka-pfs-00", Network Working Group, Oct. 30, 2017, pp. 1-20, Internet-Draft Updates: 5448.

* cited by examiner

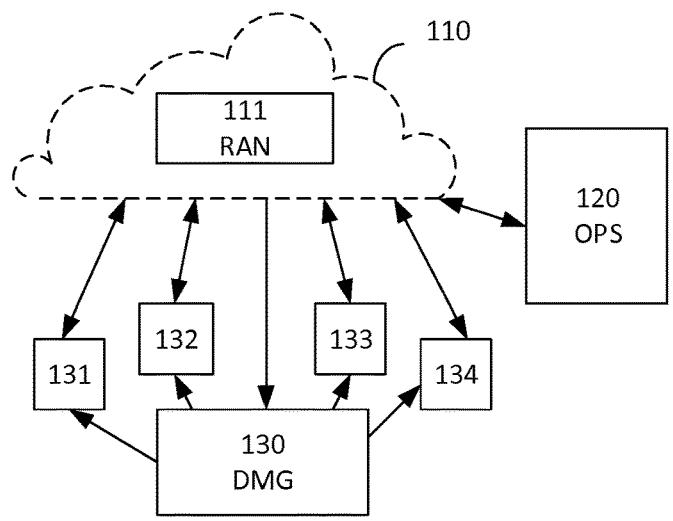
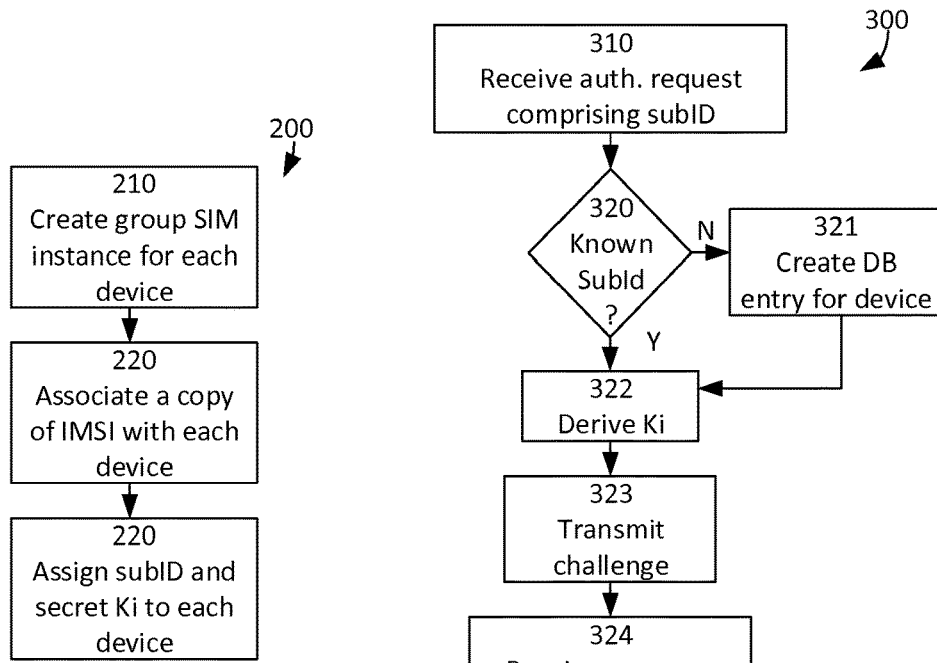
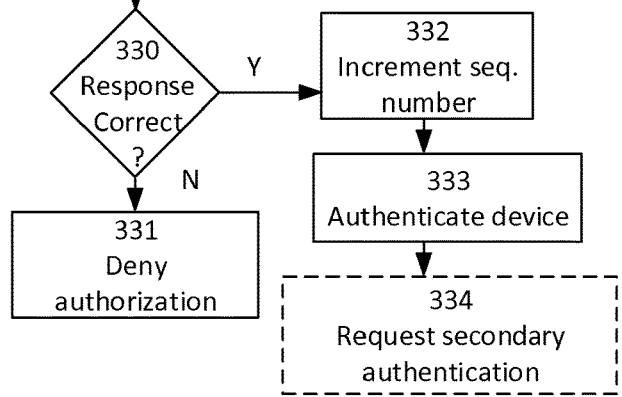
Fig.1
Fig.2
Fig.3

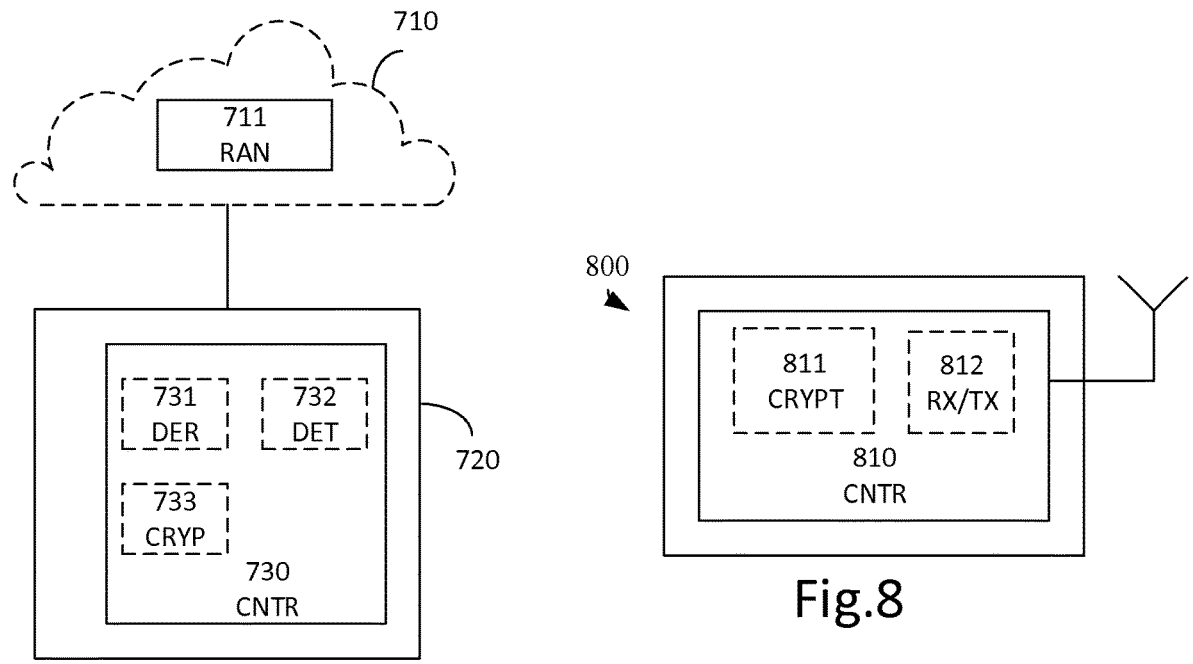
Fig.7
Fig.8
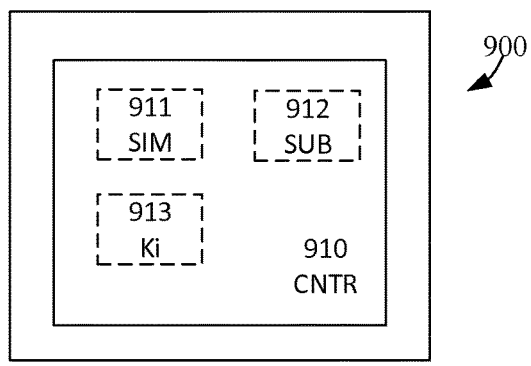
Fig.9
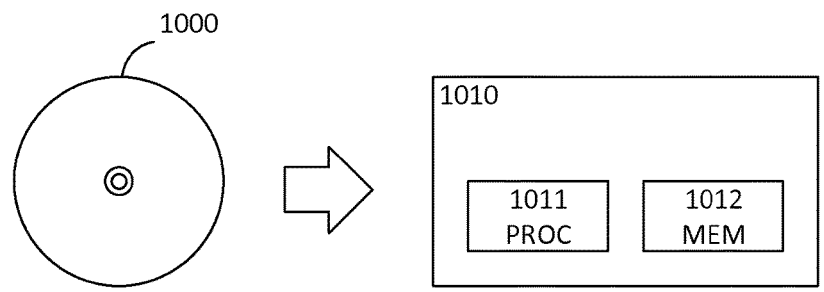
Fig.10

COMMUNICATION DEVICE AUTHENTICATION FOR MULTIPLE COMMUNICATION DEVICES

TECHNICAL FIELD

The present invention relates generally to the field of wireless communication networks, more particularly it relates to communication device authentication of multiple communication devices in a wireless communication network.

BACKGROUND

The development in the field of wireless communication is rapidly going forward from the fourth generation (4G) to the fifth generation (5G).

The third generation partnership project (3GPP) is e.g. working on 5G development. 3GPP is among other things investigating the associated core network of a 5G system which provides services to the connecting users, typically ranging from authentication to IP address assignment and routing of packets.

However, the 5G core network may be significantly different from previous generations.

One of the planned changes relates to how user equipment (UE) authentication happens in 5G networks. Generally that an extensible authentication framework, extensible authentication protocol (EAP) will be used.

EAP is defined as an authentication framework, and not a specific authentication mechanism. It provides some common functions and negotiation of authentication methods called EAP methods. There are currently about 40 different EAP methods defined.

Existing EAP methods, such as extensible authentication protocol authentication and key agreement prime (EAP-AKA') can typically be used to support SIM-based authentication, but the architecture allows in principle any EAP method to be used to authenticate UEs.

Some of the potential other EAP methods may include EAP transport layer security (EAP-TLS), based on certificates, or EAP tunneled transport layer security (EAP-TTLS), based on a tunnel authenticated by certificates and inside which passwords or other traditional authentication credentials can be used. Given the open nature of the EAP framework, new methods as well as extensions of existing methods may typically be relatively easily defined.

Another technology which is typically expected to increase and be utilized more as the 5G systems are developed is the internet of things (IoT). The IoT is the network of physical communication devices, vehicles, home appliances, sensors and other items embedded with certain types of electronics. Some predict that the IoT will comprise about 30 billion communication devices by 2020. This large amount of communication devices typically poses some challenges for developing new network structures.

For example, one potential problem with current and planned 5G authentication mechanisms is that when an operator wants to provide a service to a large user having many (perhaps millions) of communication devices, the SIM card management can typically become difficult. It would also be beneficial if the communication devices could utilize a network (e.g. a 5G network) structure provided by an operator. However it is not trivial for an operator to be able to authorize a large number of connected communication devices without imposing complicated protocols and processes.

Therefore, there is a need for methods, arrangements and apparatuses enabling authorization of a large number of connected communication devices without causing undue burden on the network operator.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to mitigate at least some of the above disadvantages and to provide methods, arrangements, apparatuses and computer program products for enabling simple authentication between an operator authentication server and communication devices associated with a communication device manager.

According to a first aspect this is achieved by a method in an operator authentication server for authentication of a communication device associated with a communication device manager. The communication device manager being associated with a plurality of communication devices, wherein the operator authentication server has transmitted group subscriber identity module (SIM) information to the communication device manager, wherein the group SIM information is associated with an international mobile subscriber identity (IMSI) number and a shared secret K. The method comprising receiving from the communication device a request for authentication comprising a sub identifier associated with the communication device and determining whether the sub identifier is known. When it is determined that the sub identifier is known, the method comprises deriving a secret Ki associated with the communication device based on the shared secret K, and the sub identifier and transmitting a challenge to the communication device, wherein the challenge is formed cryptographically based on the derived secret Ki. The method also comprises receiving from the communication device a response to the challenge, wherein the response is cryptographically formed based on the derived secret Ki, and determining whether the received response is correct by confirming that it was cryptographically formed by using the derived secret Ki. When it is determined that the received response is correct, the method comprises authenticating the communication device and derive a first session key based on the derived secret Ki.

In some embodiments, determining whether the sub identifier is known comprises determining whether the sub identifier is present in a sub identifier list.

In some embodiments, when it is determined that the sub identifier is stored in the sub identifier list, the method further comprises retrieving a sequence number associated with the stored sub identifier. When it is determined that the sub identifier is not stored in the sub identifier list, the method further comprises creating a new database entry for the sub identifier in the sub identifier list, wherein the new entry comprises the sub identifier and a sequence number, and setting the sequence number to an initial value.

In some embodiments, following successful authentication of the communication device by the operator authentication server, a secondary authentication is performed between the communication device and a communication device manager authentication server, wherein the method further comprises connecting to the communication device manager authentication server in order to enable the communication device manager authentication server to initiate the secondary authentication and transferring messages between the communication device and the communication device manager authentication server. Wherein the messages are tunnelled within a protection envelope provided by the successful authentication between the communication device and the operator authentication server. The method also comprises receiving a notification from the communication device manager authentication server indicating successful secondary authentication or non-successful secondary authentication.

In some embodiments, when a notification is received indicating successful authentication, the method comprises deriving a final session key by binding together the first session key and a second session key comprised in the notification and determining the secondary authentication process to be successful.

A second aspect is a method in a communication device for authenticating the communication device by an operator authentication server, the communication device being associated with a communication device manager. The communication device manager is associated with a plurality of communication devices, wherein the communication device manager has received from the operator authentication server group subscriber identity module (SIM) information. The group SIM information is associated with an international mobile subscriber identity (IMSI) number and a shared secret K. The method comprises receiving a copy of the IMSI number associated with an instance of the group SIM information from the communication device manager, receiving a sub identifier from the communication device manager and receiving a derived secret Ki being derived from the shared secret K and the sub identifier. The sub identifier serves to identify the communication device and wherein the derived secret Ki serves to authenticate the communication device. The method also comprises transmitting a request for authentication to the operator authentication server comprising the sub identifier associated with the communication device and receiving a challenge from the operator authentication server, wherein the challenge is formed cryptographically based on the derived secret Ki. The method also comprises transmitting a response to operator authentication server, wherein the response is formed cryptographically based on the derived secret Ki and deriving a first session key based on the derived secret Ki.

A third aspect is a method in a communication device manager for enabling authentication of a plurality of communication devices to an operator authentication server. The communication device manager being associated with the plurality of communication devices, wherein the communication device manager has received from the operator authentication server a group subscriber identity module (SIM) information. The group SIM information is associated with an international mobile subscriber identity (IMSI) number and a shared secret K. The method comprising creating an instance of the group SIM information for each of the plurality of communication devices, associating a respective copy of the IMSI number with each of the plurality of communication devices, assigning a respective sub identifier to each of the plurality of communication devices and assigning a derived secret Ki being derived from the shared secret K and the respective sub identifier to each of the plurality of communication devices, wherein the respective sub identifier serves to identify each of the plurality of communication devices and wherein the derived secret Ki serves to authenticate each of the plurality of communication devices.

A fourth aspect is an arrangement of an operator authentication server for authentication of a communication device associated with a communication device manager, the communication device manager being associated with a plurality of communication devices. Wherein the operator authentication server has transmitted group subscriber identity module (SIM) information to the communication device manager, wherein the group SIM information is associated with an international mobile subscriber identity (IMSI) number and a shared secret K. The arrangement comprises a controller configured to cause reception from the communication device of a request for authentication comprising the a sub identifier associated with the communication device and determination of whether the sub identifier is known. When it is determined that the sub identifier is known, the controller is further configured to cause derivation of a secret Ki associated with the communication device based on the shared secret K, and the sub identifier and transmission of a challenge to the communication device, wherein the challenge is formed cryptographically based on the derived secret Ki. The controller is also configured to cause reception from the communication device of a response to the challenge, wherein the response is cryptographically formed based on the derived secret Ki, and determination of whether the received response is correct by confirming that it was cryptographically formed by using the derived secret Ki. When it is determined that the received response is correct, the controller is configured to cause authentication of the communication device and derivation of a first session key based on the derived secret Ki.

In some embodiments, the controller may be further configured to cause determining whether the sub identifier is known by causing determination of whether the sub identifier is present in a sub identifier list.

In some embodiments, when it is determined that the sub identifier is stored in the sub identifier list, the controller is further configured to cause retrieval of a sequence number associated with the stored sub identifier.

In some embodiments, when it is determined that the sub identifier is not stored in the sub identifier list, the controller is further configured to cause creation of a new database entry for the sub identifier in the sub identifier list comprising the sub identifier and a sequence number and setting the sequence number to an initial value.

In some embodiments, following successful authentication of the communication device by the operator authentication server, a secondary authentication is performed between the communication device and a communication device manager authentication server. The controller is further configured to cause connection to the communication device manager authentication server in order to enable the communication device manager authentication server to initiate the secondary authentication. The controller is also configured to cause transferral of messages between the communication device and the communication device manager authentication server, wherein the messages are tunnelled within an protection envelope provided by the successful authentication between the communication device and the operator authentication server and reception of a notification from the communication device manager authentication server indicating successful secondary authentication or non-successful secondary authentication.

In some embodiments, when a notification is received indicating successful authentication, the controller is configured to cause binding together of the first session key and a second session key received in the notification and determination of the secondary authentication process to be successful.

A fifth aspect is an operator authentication server comprising the arrangement according to any of the fourth aspect.

A sixth aspect is a communication device configured to communicate with an operator authentication server, the communication device being associated with a communication device manager. The communication device manager is associated with a plurality of communication devices, wherein the communication device manager has received from the operator authentication server group subscriber identity module (SIM) information. The group SIM information is associated with an international mobile subscriber identity (IMSI) number and a shared secret K. The communication device comprises a controller configured to cause reception of a copy of the IMSI number associated with the instance of the group SIM information from the communication device manager and reception of a sub identifier from the communication device manager. The controller is also configured to cause reception of a derived secret Ki being derived from the shared secret K and the sub identifier, wherein the sub identifier serves to identify the communication device and wherein the derived secret Ki serves to authenticate the communication device and transmission of a request for authentication to the operator authentication server comprising the sub identifier associated with the communication device. The controller is also configured to cause reception of a challenge from the operator authentication server, wherein the challenge is formed cryptographically based on the derived secret Ki, transmission of a response to operator authentication server, wherein the response is formed cryptographically based on the derived secret Ki and derivation of a first session key based on the derived secret Ki.

A seventh aspect is a communication device manager for enabling authentication of a plurality of communication devices to an operator authentication server. The communication device manager being associated with the plurality of communication devices, wherein the communication device manager has received from the operator authentication server a group subscriber identity module (SIM) information. Wherein the group SIM information is associated with an international mobile subscriber identity (IMSI) number and a shared secret K. Wherein the communication device manager comprises a controller configured to cause creation of an instance of the group SIM information for each of the plurality of communication devices, association of a respective copy of the IMSI number with each of the plurality of communication devices, assignment of a respective sub identifier to each of the plurality of communication devices and assignment of an derived secret Ki being derived from the shared secret K and the respective sub identifier to each of the plurality of communication devices, wherein the respective sub identifier serves to identify each of the plurality of communication devices and wherein the derived secret Ki serves to authenticate each of the plurality of communication devices.

An eight aspect is a computer program product comprising a non-transitory computer readable medium, wherein the computer readable medium has stored there on a computer program comprising program instructions, wherein the computer program is configured to be loadable into a data-processing unit, comprising a processor and a memory associated with or integral to the data-processing unit, wherein when loaded into the data-processing unit, the computer program is configured to be stored in the memory, and wherein the computer program, when loaded into and run by the processor is configured to cause the processor to execute method steps according to any of the first, second and third aspects.

In some embodiments, the second, third, fourth, fifth, sixth and seventh aspects may additionally have features identical with or corresponding to any of the various features as explained above for the first aspect.

An advantage of some embodiments is that authentication between a network operator server and several communication devices, e.g. IoT communication devices is simplified.

Another advantage of some embodiments is that a network is enabled which is easily scaled to the number of connected communication devices, without having to take this into consideration when designing the network.

BRIEF DESCRIPTION OF THE DRAWINGS

Further objects, features and advantages will appear from the following detailed description of embodiments, with reference being made to the accompanying drawings, in which:

FIG. 1 is schematic drawing illustrating a network topology according to some embodiments;

FIG. 2 is a flowchart illustrating example method steps according to some embodiments;

FIG. 3 is a flowchart illustrating example method steps according to some embodiments;

FIG. 7 is a block diagram illustrating an example arrangement according to some embodiments;

FIG. 8 is a block diagram illustrating an example communication device according to some embodiments;

FIG. 9 is a block diagram illustrating an example communication device manager according to some embodiments; and FIG. 10 is a schematic drawing illustrating a non-transitory computer program product according to some embodiments.

DETAILED DESCRIPTION

Figure 4:
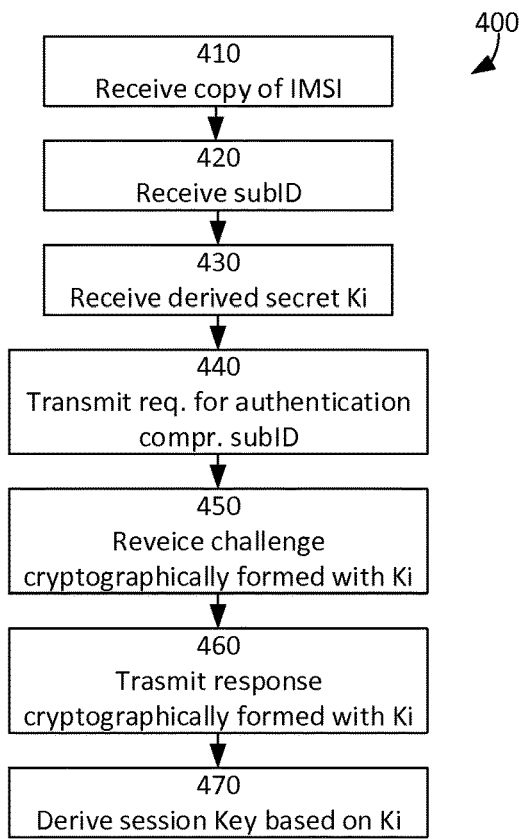
FIG. 4 is a flowchart illustrating example method steps according to some embodiments.

In the following, embodiments will be described where authentication of plurality i.e. a large number of connected communication devices to an operator of a wireless communication network is simplified. The term plurality is used herein when referring to an integer number which is greater than one, i.e. from two and upwards.

A change in the 5G architecture, which may possibly become a reality, is to implement a so-called Service-Based Architecture or SBA. In this new architecture, a number of the interfaces within the core network (including roaming interfaces) may be changed from legacy telecom style to modern, web-based APIs. The details of these application programming interfaces (APIs) are typically being currently worked on by 3GPP.

This disclosure is concerned with arrangements relating to authentication for industrial and IoT vertical use cases, such as e.g. automation or robots in a factory or a possibly large deployment of IoT communication devices, etc. In those use cases it may typically be assumed that an operator may provide the network (e.g. a 5G network) to the vertical industry.

A vertical industry may typically be an industry which has specialized in a certain type of product, or that the industry caters to the needs of a specific group.

The primary problem with current and planned 5G authentication mechanisms may be that when an operator wants to provide a service to a large user with many (hundreds, thousands or even perhaps millions) of communication devices, the SIM card management can become difficult (as previously mentioned). It would hence be beneficial if the user (such as a company or organization operating in an IoT vertical) could use their own authentication infrastructure for managing their communication devices, while still being able to utilize the provided network.

A typical scenario may be a factory which produces or manufactures some sort of goods. The factory may have been fairly automated and hence may employ a large number of robots for the production lines. These robots may typically be IoT communication devices connected to a network, and it would be beneficial if they could utilize the network which is provided by a network operator.

However, if the network operator has to provide individual identification for each of the communication devices (robots in this case) of the factory it would be problematic since the operator would require knowledge of the number of robots. Further, the operator would also typically have to design the systems in a scalable way.

This, places undue burden on the operator.

According to some embodiments of this disclosure, the solution is to allow the authentication to be provided by the factory in this case. In order to ensure that the operator's network is not used by unauthorized communication devices, there should preferably be provided an assurance that the connecting communication devices associated with the factory are authorized. This assurance should typically be provided by the factory.

It should be noted that the embodiments described herein do not only apply to factories with robots. Hence, the term communication device may in this disclosure be used for users that are typically IoT communication devices (such as e.g. robots, wireless communication devices, sensors, alarm systems etc.), and the term communication device manager is used for the client which manage the communication devices (such e.g. a factory which may manage communication devices such as robots).

The terms factory and communication device manager may be used interchangeably in this disclosure. It is to be noted that a factory may e.g. utilize a large amount of communication devices (e.g. robots) and may hence be seen as a communication device manager. In order to provide an assurance of authorization to the operator, a "group SIM" may be created that can easily be replicated by the communication device manager on its own end e.g. by creating an instance of the group SIM, but each communication device can still be separately identified and the operator can authenticate that the group SIM is being used.

The group SIM may e.g. in some embodiments comprise an international mobile subscriber identity (IMSI) number which may be used for creating the replicas, i.e. the instances of the group SIM may comprise the IMSI number.

FIG. 1 illustrates a network scenario according to some embodiments.

In FIG. 1, an operator authentication server (OPS) 120 is operatively connected to a radio access network (RAN) 111 which may be comprised in a network cloud 110. The radio access network 111 may e.g. be a 5G wireless communication network or any other type of communication network.

The network cloud may in some embodiments furthermore be connected to a core network (not shown) and may comprise radio control function managers and operation and maintenance functionality. In some embodiments, the network cloud may also be connected to a host computer. Data and information may be stored in the network cloud and accessible by communication devices connected to it.

A communication device manager (DMG) 130 is also associated with the radio access network 111 and may receive group SIM information from the operator authentication server 120 through the radio access network.

A plurality of communication devices 131, 132, 133 and 134 are connected or associated with the communication device manager. The plurality of communication devices 131-134 may also be connected or associated with the radio access network such that they may perform authentication towards the operator authentication server 120.

In some embodiment, the communication device(s) may be any device intended for accessing services via an access network and configured to communicate over the access network. For instance, the device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The device may be a portable, pocket-storable, hand-held, computer-comprised, or vehicle-mounted mobile device, enabled to communicate voice and/or data, via a wireless or wireline connection.

Furthermore, in some embodiments, the communication device(s) may be a user equipment, machine to machine (M2M) device or machine type communication (MTC) device.

In some embodiments, the operator authentication server 120 may be comprised in a host computer associated with the network cloud 110. In some embodiments, the operator authentication server may be comprised in an evolved node B (eNB) or a generation node B (gNB).

In some embodiments, the communication devices 131-134 may be in the range of hundreds, thousands or millions of communication devices. It is to be noted that the number of communication devices may be other such as less than hundreds, between thousands and millions and more than millions.

In some embodiments, the communication devices 131-134 may be e.g. robots, or vehicles, or other items having electronics, software, sensors, actuators, and network connectivity which enable these objects to connect and exchange data.

In some embodiments, the communication device manager 130 may e.g. be a factory, a supermarket, an office building, a vehicle or other manager of several communication devices.

FIG. 2 illustrates a method 200 which may be performed in (or by, i.e. a method of a communication device manager) a communication device manager for enabling authentication of a plurality of communication devices to an operator authentication server. The communication device manager may be associated with the plurality of communication devices and the communication device manager has received from the operator authentication server group subscriber identity module (SIM) information, wherein the group SIM information is associated with an international mobile subscriber identity (IMSI) number and a shared secret K.

The shared secret K may e.g. be a token, a character, a number or any other suitable item. The shared secret K may function e.g. as a password in some embodiments.

The method 200 may e.g. in some embodiments, be carried out by the communication device manager 130 as described in conjunction with FIG. 1. In the same manner, the plurality of communication devices may be the communication devices 131-134 and the operator authentication server may be the operator authentication server 120 in FIG. 1.

The method starts in 210 where the communication device manager creates an instance of the group SIM information for each of the plurality of communication devices.

Hence the individual communication devices do not receive physical copies of the group SIM, but instead derivates of it. Hence in some embodiments, only information on the group SIM may be exchanged and the IMSI number may instead be copied for each of the plurality of communication devices.

The instance of the group SIM may thus be a derivate of the original group SIM.

In step 220 the communication device manager associates a respective copy of the IMSI number with each of the plurality of communication devices In step 230 of the method 200 the communication device manager assigns a respective sub identifier (subID) to each of the plurality of communication devices as well as assigning a derived secret Ki being derived from the shared secret K and the respective sub identifier to each of the plurality of communication devices. The respective sub identifier serves to identify each of the plurality of communication devices and the derived secret Ki serves to authenticate each of the plurality of users.

In some embodiments, the derived secret Ki may be a hashing of the shared secret K and the respective sub identification.

In some embodiments, the derived secret Ki is any suitable derivation of the shared secret K and the respective sub identifier.

In some embodiments, the sub identifier may be comprised within the IMSI number. The sub identifier may e.g. be a part of the IMSI number.

In some embodiments the sub identifier may be one or more of an integer, a character, a prime, a binary number or any other suitable representation. What is important is that the sub identifier is unique for a certain communication device.

The authentication process is typically a process which in some embodiments may involve several different entities, such as e.g. the communication device manager (for providing each of the communication devices with individual identification), the operator authentication server (for authenticating the individual communication devices) and the communication devices (for requesting authentication from the operator so that they may use the network which the operator provides).

FIG. 3 illustrates a method in (or performed by) an operator authentication server for authentication of a communication device associated with a communication device manager. The communication device manager may be associated with a plurality of communication devices, and the operator authentication server may have transmitted group subscriber identity module (SIM) information to the communication device manager.

The group SIM information is associated with an international mobile subscriber identity (IMSI) number and a shared secret K (compare with the method 200).

In some embodiments, the communication device manager, operator authentication server and communication device(s) may be corresponding to the communication device manager, operator authentication server and communication device(s) as previously described for any of the FIGS. 1-2.

The method 300 starts in step 310 where the operator authentication server receives from the communication device a request for authentication comprising a sub identifier associated with the communication device (compare with method 200).

In step 320 the operator authentication server determines whether the sub identifier is known to the operator authentication server.

In some embodiments, if it is determined that the sub identifier is not known (N-path out of 320), the method further 300 may continue in step 321 with creating a new database entry for the sub identifier in a sub identifier list, wherein the entry comprises the sub identifier and a sequence number and setting the sequence number to an initial value.

In some embodiments, the method 300 may e.g. comprise determining whether the sub identifier is known by determining whether the sub identifier is present in the sub identifier list (step not shown in FIG. 300). Wherein if it is determined that the sub identifier is stored in the sub identifier list, the method may in some embodiments further comprise retrieving a sequence number associated with the stored sub identifier.

The sub identifier list may e.g. be present in a network cloud (e.g. the network cloud described in FIG. 1).

The initial value of the sequence number may e.g. be set to 1. However other values are possible. What is important is that the sequence number is set such that it is possible to keep track on how many successful authentications that has been performed for the communication device by the operator authentication server. The sequence number may thus be revised with every successful authentication in order to reflect the number of successful authentications. The sequence number may e.g. be incremented or decreased for each successful authentication.

From step 321, the method then continues in 322.

If in step 320 it is determined that the sub identifier is known (Y-path out of 320) to the operator authentication server (e.g. by finding the sub identifier in the sub identifier list as explained above), the method continues in 322 with deriving a secret Ki associated with the communication device based on the shared secret K, and the sub identifier.

The secret Ki may e.g. be a hashing of the shared secret K and the sub identifier (compare with the secret Ki as described in the method 200).

The operator authentication server, having knowledge of the shared secret K and the sub Identifier of the communication device, will be able to derive the secret Ki for the communication device as well. Hence the communication device does not need to actually share its Ki with the operator authentication server.

In step 323 the method comprises transmitting a challenge to the communication device, wherein the challenge is formed cryptographically based on the derived secret Ki. Any suitable cryptograph process may be used.

The method 300 then continues in 324 where the operator authentication server receives from the communication device a response to the challenge, wherein the response is cryptographically formed based on the derived secret Ki.

In step 330 it is determined whether the received response is correct by confirming that it was cryptographically formed by using the derived secret Ki. Although the derived secret Ki is never shared, the authentication may still be performed due to the cryptographically formed challenge and corresponding response. If authentication server cannot validate the response it is an indication that the secret Ki is incorrect and the communication device is hence not entitled to use the network in the name of the communication device manager.

If there is an issue between the communication device and the operator authentication server, such as e.g. that the communication device is not actually an a user under the communication device manger, the communication device and the operator authentication server will not be able to derive the same Ki, and hence they will not be able to read each other's challenge and response.

Hence, in step 331, if it is determined that the response is incorrect (N-path out of 330) the method continues in 331 where the operator authentication server denies authentication of the communication device.

However, when it is determined that the received response is correct (Y-path out of 330) the method continues in 332 where the sequence number may be incremented (or otherwise altered to reflect the successful authentication). In step 333 the method 300 continues with authentication of the communication device and deriving of a first session key based on the derived secret Ki.

In some embodiments, after a successful authentication, the method may in some embodiments optionally (as marked by the dashed lines) continue in step 334 with a secondary authentication. This will be explained further in conjunction with FIG. 5.

As elaborated on above, the authentication process may in some embodiments be an interaction between the communication device manager, the operator authentication server and the communication device(s).

FIG. 4 illustrates an example method 400 according to some embodiments for a communication device.

Method 400 is a method in (or a method of) a communication device for authenticating the communication device by an operator authentication server. The communication device may be associated with a communication device manager and the communication device manager being associated with a plurality of communication devices. The communication device manager has received from the operator authentication server group subscriber identity module (SIM) information.

The group SIM information may be associated with an international mobile subscriber identity (IMSI) number and a shared secret K.

In some embodiments, the communication device, communication device manager and operator authentication server may be any of the communication device(s), communication device manager and operator authentication server as described in conjunction with any of the FIGS. 1-3.

The method starts in 410 wherein the communication device receives a copy of the IMSI number associated with an instance of the group SIM information from the communication device manager (compare with step 210 and 220 of the method 210)

In step 420, the communication device receives a sub identifier from the communication device manager (compare with step 220 of the method 200.

In step 430, the communication device receives a derived secret Ki being derived from the shared secret K and the sub identifier, wherein the sub identifier serves to identify the communication device and wherein the derived secret Ki serves to authenticate the communication device (compare with step 220 of the method 200).

In step 440 the communication device transmits a request for authentication to the operator authentication server comprising the sub identifier associated with the communication device (compare with step 310 of the method 300).

In step 450, the communication device receives a challenge from the operator authentication server, wherein the challenge is formed cryptographically based on the derived secret Ki (compare with step 323 of the method 300)

The communication device may thus verify that the challenge comes from the home network based on the derived secret Ki. If the challenge had been formed cryptographically based on anything else than the derived secret Ki, the communication device would have interpreted that as having contacted the wrong operator authentication server.

In step 460 the communication device transmits a response to operator authentication server, wherein the response is formed cryptographically based on the derived secret Ki (compare with step 324 of the method 300).

In step 470, the communication device derives a first session key based on the derived secret Ki.

Figure 5:
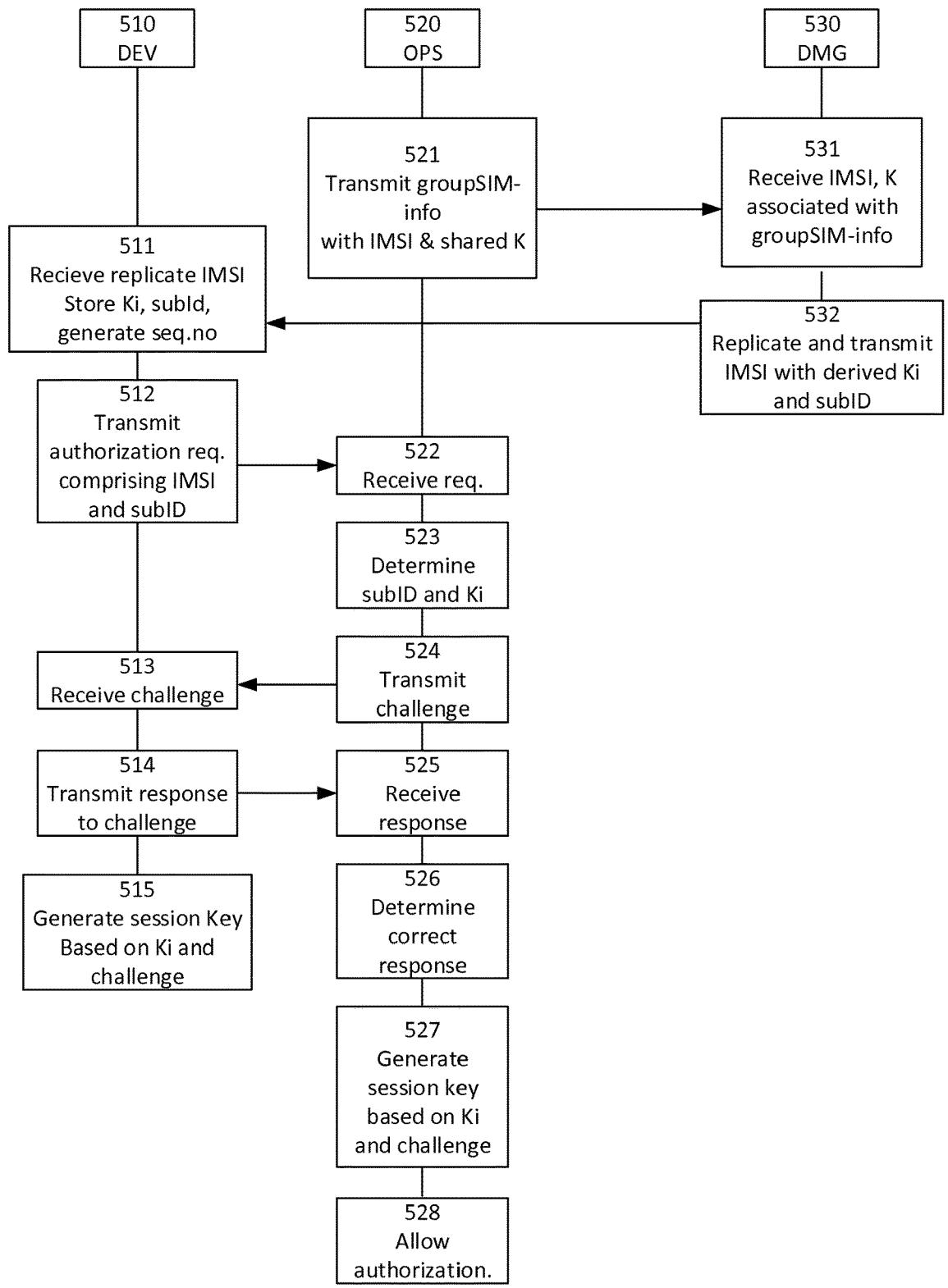
FIG. 5 is a combined flowchart and signaling diagram illustrating example method steps according to some embodiments.

As previously mentioned the authentication process may in some embodiments be a collaboration between the operator authentication server, the communication device manager and the communication device(s) as is illustrated in FIG. 5 which figure shows a combined flowchart and signalling diagram.

FIG. 5 illustrates a communication device (DEV) 510, an operator authentication server (OPS) 520 and a communication device manager (DMG) 530.

In some embodiments, the communication device 510, operator authentication server 520 and communication device manager 530 may e.g. be any of the communication device(s), operator authentication server and communication device manager as described in conjunction with any of the FIGS. 1-4.

The method 500 may e.g. start in step 521 where the operation authentication manager transmits group subscriber identity module (SIM) information to the communication device manager 531 (compare with step 210 of the method 200), wherein the group SIM information is associated with an international mobile subscriber identity (IMSI) number and a shared secret K.

In step 531 the communication device manager 530 may receive the group SIM information (compare with step 210 of the method 200), and in step 432 the communication device manager may create an instance of the group SIM information for each of the plurality of communication devices (i.e. for the communication device 510 in this example) and associate a respective copy of the IMSI number with each of the plurality of communication devices (compare with step 210 of the method 200). The communication device manager 530 may further assign a respective sub identifier to each of the plurality of communication devices and assign a derived secret Ki, being derived from the shared secret K and the respective sub identifier, to each of the plurality of communication devices (compare with step 230 of the method 200), wherein the respective sub identifier serves to identify each of the plurality of communication devices and wherein the derived secret Ki serves to authenticate each of the plurality of communication devices.

In step 511 of the method 500 the communication device 510 receives a copy of the IMSI number (compare with steps 220 and 410 of the methods 200 and 400) associated with the instance of the group SIM information from the communication device manager, a sub identifier (compare with steps 230 and 420 of the methods 200 and 400) from the communication device manager and a derived secret Ki (compare with steps 230 and 430 of the methods 200 and 400) being derived from the shared secret K and the sub identifier, wherein the sub identifier serves to identify the communication device and wherein the derived secret Ki serves to authenticate the communication device.

Then in step 512, the communication device 510 transmits a request for authentication to the operator authentication server 520 comprising the sub identifier associated with the communication device (compare with steps 310 and 440 of the methods 300 and 400).

In step 522, the operator authentication server receives the request for authentication comprising the sub identifier associated with the communication device (compare with steps 310 and 440 of the methods 300 and 400).

In step 523 the operation authentication server determines whether the sub identifier is known (compare with step 320 of the method 300), wherein if it is determined that the sub identifier is known, the operator authentication server derives the secret Ki associated with the communication device based on the shared secret K, and the sub identifier (compare e.g. with steps 321 and 322 of the method 300).

In step 524 the operator authentication server transmits a challenge to the communication device 510 (compare with step 323 of the method 300), wherein the challenge is formed cryptographically based on the derived secret Ki.

Then in step 513, the communication device 510 receives the challenge from the operator authentication server (compare with step 450 of the method 400), wherein the challenge is formed cryptographically based on the derived secret Ki.

In step 514, the communication device transmits a response to operator authentication server (compare with step 460 of the method 400), wherein the response is formed cryptographically based on the derived secret Ki.

Then the communication device continues in step 515 with deriving a first session key based on the derived secret Ki (compare with step 470 of the method 400).

Furthermore, in step 525, the operator authentication server receives from the communication device the response to the challenge (compare with step 324 of the method 300), wherein the response is cryptographically formed based on the derived secret Ki.

In step 526, the operator authentication server determines whether the received response is correct by confirming (compare with step 330 of the method 300) that it was cryptographically formed by using the derived secret Ki, and when it is determined that the received response is correct, the method continues in 527 where the operator authentication server authenticates the communication device and derives a first session key based on the derived secret Ki (compare with step 333 in the method 300).

Hence, the communication device 510 and the operator authentication server 520 individually derive the same session key at their own ends indicating successful authentication.

In some embodiments, the method described in conjunction with FIG. 5 may be a combination of the methods 200, 300 and 400 described in FIGS. 2-4.

The authentication method above further presents advantages since it may in some embodiments be used prior to a secondary authentication between a server of the communication device manger and the communication device(s). An agreement may e.g. be made between the communication device manager and the operator authentication server that a secondary authentication should always take place between the communication device and the communication device manager after the first authentication by the operator authentication server was successful. This secondary authentication may serve to increase security within the system.

In some embodiments, it may be beneficial to let the group SIM authentication be carried out between the communication device and the operator authentication server, but then allow the communication device manager to require another authentication that leverages credentials that it already has for its communication devices.

In some embodiments, the operator authentication server does not have to take an active part in the secondary authentication, but may instead act as a relay which forwards messages between the authenticated communication device and the communication device manager server. The data which is used for the secondary authentication may be in some embodiments be tunnelled within the forwarded messages.

Tunnelled authentication protocols (such as those already existing in EAP) perform an authentication themselves by creating a secure envelope that can then be used to "tunnel" a secondary authentication. For instance, existing tunnelling authentication protocols such as EAP-TTLS use TLS to create a secure envelope, authenticating the server but not the communication device, and then proceed to authenticate the communication device with another EAP method. There can be security benefits to this two-step authentication process, for instance, when a weak authentication method is protected by a stronger authentication method's tunnel such as EAP-MD5 inside EAP-TTLS.

Figure 6:
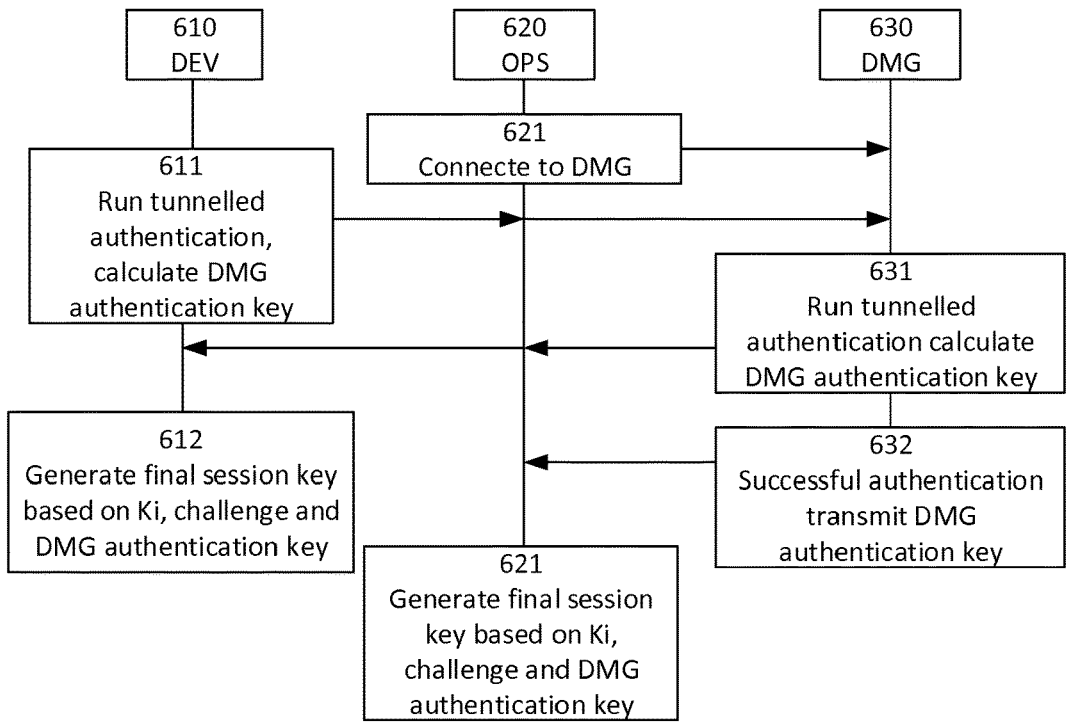
FIG. 6 is a combined flowchart and signaling diagram illustrating example method steps according to some embodiments.

FIG. 6 illustrates a combined flowchart and signalling diagram for a secondary authentication process according to some embodiments.

In some embodiments, the described method steps may follow after the method steps described in FIG. 5. Hence, in some embodiments, the methods as described in FIG. 5 and FIG. 6 may be combined.

FIG. 6 illustrates a communication device (DEV) 610, an operator authentication server (OPS) 620 and a communication device manager authentication (DMG) 630 server.

In some embodiments, the communication device 610 and the operator authentication server 620 may be any of the communication device(s) and operator authentication server as described in conjunction with any of the FIGS. 1-4.

In some embodiments, the communication device manager authentication server 630 may be the communication device manger as described in conjunction with any of the FIGS. 1-5.

In some embodiments, the communication device manager described in any of the FIGS. 1-5 may comprise the communication device manager authentication server 630.

The method according to FIG. 6 may commence following successful authentication of the communication device by the operator authentication server. And a secondary authentication is performed between the communication device and a communication device manager authentication server (compare with the method of FIG. 5).

The method starts in 621 where the operator authentication server 620 connects to the communication device manager authentication server 630 in order to enable the communication device manager authentication server 630 to initiate the secondary authentication.

In step 611 the communication device 610 transmits tunnelled messages via the operator authentication server 620 to the communication device manager authentication server 630. Hence the operator authentication server 620 transfers messages between the communication device 610 and the communication device manager authentication server 630, wherein the messages are tunnelled within an protection envelope provided by the successful authentication between the communication device 610 and the operator authentication server 620.

In some embodiments, the messages may be tunnelled using any suitable tunnel protocol that performs the group SIM authentication. Also in step 611 the communication device derives a communication device manager authentication server session key (i.e. a second session key, compare with the method described in FIG. 5 or the method 300 and 400).

As the communication device manager authentication server 630 receives the tunnelled messages from the communication device 610 it responds in 631 with a tunnelled message to the communication device 610, and derives the same communication device manager authentication server session key. This indicates successful secondary authentication and in step 632 the communication device manager authentication server 630 transmits the communication device manager authentication server session key to the operator authentication server 620.

The operator authentication server 620 hence receives a notification from the communication device manager authentication server 630 indicating successful authentication or non-successful authentication. In some embodiments, if the notification comprises the derived communication device manager authentication server session key (i.e. the second session key), then the operator authentication server will interpret this as if the secondary authentication was successful.

Then in step 621 the operator authentication server may generate a final session key based on the successful authentication between the operator authentication server 620 and the communication device 610 (e.g. the authentication as described in conjunction with FIG. 5) and the communication device manager authentication server session key.

The final session key may e.g. be based on the secret Ki and the challenge of the first authentication (i.e. the successful authentication between the communication device and the operator authentication server compare with any of the FIGS. 3-5) and the communication device manager authentication server session key.

In some embodiments, the communication device may also derive the communication device manager authentication session key e.g. in the same manner as it is derived by the communication device manager authentication server 630 explained above, which derivation may be performed simultaneously, prior to, or after step 621 by the communication device 610. Furthermore, in some embodiments, when a notification is received by the operator authentication server indicating successful authentication, the method may comprise deriving a final session key by binding together the first session key and a second session key comprised in the notification, and determining the secondary authentication process to be successful.

In some embodiments, the communication device 610 may also in step 612 derive the final session key in the same manner as explained above for the operator authentication server.

FIG. 7 illustrates an arrangement 720 according to some embodiments.

The arrangement 720 may e.g. be of an operator authentication server for authentication of a communication device associated with a communication device manager. The communication device manager may be associated with a plurality of communication devices. The operator authentication server has transmitted group subscriber identity module (SIM) information to the communication device manager, wherein the group SIM information is associated with an international mobile subscriber identity (IMSI) number and a shared secret K.

The arrangement 720 may be connected to a network cloud 710. The network cloud 710 may form a radio access network (RAN) 711.

In some embodiments, the network cloud 710 and radio access network 711 may be the network cloud and radio access network as described in conjunction with FIG. 1.

The arrangement may comprise a controller 730 configured to cause reception from the communication device of a request for authentication comprising a sub identifier associated with the communication device.

The controller 730 may also be configured to cause determination of whether the sub identifier is known; wherein if it is determined that the sub identifier is known, the controller may be further configured to cause derivation of a secret Ki associated with the communication device based on the shared secret K, and the sub identifier.

The controller 730 may also be configured to cause transmission of a challenge to the communication device, wherein the challenge is formed cryptographically based on the derived secret Ki and reception from the communication device of a response to the challenge, wherein the response is cryptographically formed based on the derived secret Ki.

In some embodiments, the controller 730 may further optionally comprise or be associated with a derivator (DER comprising circuitry for derivation of data) 731, a determiner (DET comprising circuitry configured to make determination based on received data) 732 and a cryptographer (CRYPT comprising circuitry configured to derive cryptographically formed messages) 733.

The controller may e.g. in some embodiments be configured to cause the determiner 732 to cause the determination of whether the sub identifier is known; wherein if it is determined that the sub identifier is known.

The controller 730 may also be configured to cause the derivator 731 to cause derivation of a secret Ki associated with the communication device based on the shared secret K, and the sub identifier.

The controller 730 may also be configured in some embodiments to cause the cryptographer to cause transmission of a challenge to the communication device, wherein the challenge is formed cryptographically based on the derived secret Ki.

In some embodiments, the controller 730 may be configured to cause the determiner 732 to cooperate with the cryptographer 733 to cause determination of whether the received response is correct by confirming that it was cryptographically formed by using the derived secret Ki.

The controller 730 may also be configured to cause authentication of the communication device by causing the derivator 731 to cause the derivation of a first session key based on the derived secret Ki.

In some embodiments, the controller 730 may be further configured to cause the determiner 732 to cause determination of whether the sub identifier is known by causing the determination of whether the sub identifier is present in a sub identifier list In some embodiments, if it is determined that the sub identifier is stored in the sub identifier list, the controller 730 may further configured to cause retrieval of a sequence number associated with the stored sub identifier.

If it is determined that the sub identifier is not stored in the sub identifier list, the controller 730 may be configured to cause creation of a new database entry for the sub identifier in the sub identifier list comprising the sub identifier and a sequence number and setting the sequence number to an initial value.

In some embodiments, the controller 730 may be configured to store the sub identifier list in the network cloud 710.

In some embodiments, the controller 730 may be configured to store the sub identifier list locally on a memory.

In some embodiments, wherein following successful authentication of the communication device by the operator authentication server, the controller 730 may cause a secondary authentication to be performed between the communication device and a communication device manager authentication server.

The controller 730 may hence be further configured to cause connection to the communication device manager authentication server in order to enable the communication device manager authentication server to initiate the secondary authentication.

The controller 730 may also be configured to cause transferral of messages between the communication device and the communication device manager authentication server, wherein the messages are tunnelled within a protection envelope provided by the successful authentication between the communication device and the operator authentication server.

The controller 730 may be configured to cause reception of a notification from the communication device manager authentication server indicating successful secondary authentication or non-successful secondary authentication.

In some embodiments, when a notification is received indicating successful authentication, the controller is configured to cause binding together of the first session key and a second session key comprised in notification.

The controller 730 may also be configured to cause sharing of the bound first and second session key with the communication device and determination (e.g. by causing the determiner 732) of the secondary authentication process to be successful.

In some embodiments, the arrangement 720 may be comprised in an operator authentication server. In some embodiments, the operator authentication server comprising the arrangement 720 may be any of the operator authentication server as described in conjunction with any of the previous figures.

In some embodiments, the arrangement 720 may be configured to carry out the method steps described in any of the FIGS. 3, 5, 6.

FIG. 8 illustrates a communication device according 800 according to some embodiments.

The communication device 800 may be configured to communicate with an operator authentication server, the communication device being associated with a communication device manager. The communication device manager may be associated with a plurality of communication devices, wherein the communication device manager has received from the operator authentication server group subscriber identity module (SIM) information. The group SIM information is associated with an international mobile subscriber identity (IMSI) number and a shared secret K.

The communication device 800 may further comprise a controller (CNTR) 810.

In some embodiments, the controller 810 may further optionally comprise or be associated with a transceiver (RX/TX comprising circuitry for transmitting and receiving data) 812 and a cryptographer (CRYPT comprising circuitry for forming cryptographic data) 811.

In some embodiments, the transceiver 812 is a separate transmitter and a separate receiver. In some embodiments, the transceiver 812 is a multiple input/multiple output (MIMO) arrangement.

The controller 810 may be configured to cause reception (e.g. by causing the transceiver 812 to receive) of a copy of the IMSI number associated with an instance of the group SIM information from the communication device manager.

The controller 810 may also be configured to cause reception (e.g. by causing the transceiver 812 to receive) of a sub identifier from the communication device manager.

The controller 810 may also be configured to cause reception (e.g. by causing the transceiver 812 to receive) of a derived secret Ki being derived from the shared secret K and the sub identifier, wherein the sub identifier serves to identify the communication device and wherein the derived secret Ki serves to authenticate the communication device.

In some embodiments, the controller may be configured to cause the transmission (e.g. by causing the transmission) of a request for authentication to the operator authentication server comprising the sub identifier associated with the communication device.

In some embodiments the controller 810 is configured to cause reception (e.g. by causing the transceiver 812 to receive) of a challenge from the operator authentication server, wherein the challenge is formed cryptographically based on the derived secret Ki.

The controller 810 may also be configured to cause transmission (e.g. by causing the transceiver to transmit) of a response to operator authentication server, wherein the response is formed cryptographically (e.g. by the cryptographer 811) based on the derived secret Ki.

In some embodiments, the controller 810 is further configured to cause derivation of a first session key based on the derived secret Ki.

In some embodiments, the communication device 800 may be any of the communication device(s) as described in conjunction with any of the previous figures. The communication device may e.g. be any of a robot, a wireless communication device, a user equipment, a sensor, an alarm, a security camera etc.

In some embodiments, the communication device 800 may configured to carry out the methods as described in conjunction with any of the FIGS. 4, 5 and 6.

FIG. 9 illustrates a communication device manager 900 according to some embodiments. The communication device manager 900 may be for enabling authentication of a plurality of communication devices to an operator authentication server. The communication device manager 900 may associated with the plurality of communication devices, wherein the communication device manager has received from the operator authentication server a group subscriber identity module (SIM) information. The group SIM information is associated with an international mobile subscriber identity (IMSI) number and a shared secret K.

The communication device manager comprises a controller 910 (CNTR).

In some embodiments the controller 910 may further optionally comprise or be associated with a SIM information replicator (SIM, comprising circuitry for creating instances of group SIM information) 911, a sub identifier creator (SUB, comprising circuitry for deriving individual sub identifiers) 912 and a secret Ki deriver (Ki comprising circuitry for deriving individual Ki) 913.

In some embodiments, the communication device manager 900 may be any of the communication device manager described in conjunction with any of the previous figures.

In some embodiments, the controller (CNTR) 910 is configured to cause creation (e.g. by causing the SIM information replicator 911 to create) of an instance of the group SIM information for each of the plurality of communication devices.

In some embodiments, the controller 910 is configured to cause (e.g. by causing the SIM information replicator 911) association of a respective copy of the IMSI number with each of the plurality of communication devices.

In some embodiments, the controller 910 is further configured to cause assignment (e.g. by causing the sub identifier creator 912) of a respective sub identifier to each of the plurality of communication devices.

In some embodiments, the controller 910 is configured to cause assignment (e.g. by causing the Ki deriver) of a derived secret Ki being derived from the shared secret K and the respective sub identifier to each of the plurality of communication devices, wherein the respective sub identifier serves to identify each of the plurality of communication devices and wherein the derived secret Ki serves to authenticate each of the plurality of communication devices.

In some embodiments, the communication device manager 900 is configured to carry out any of the methods described in conjunction with any of the FIGS. 2, 5 and 6.

FIG. 10 illustrates a computer program product 1000 according to some embodiments. The computer program product 1000 may comprise a non-transitory computer readable medium. Wherein the computer readable medium has stored there on a computer program comprising program instructions, wherein the computer program is configured to be loadable into a data-processing unit 1010, comprising a processor 1011 and a memory 1012 associated with or integral to the data-processing unit. When loaded into the data-processing unit 1010, the computer program is configured to be stored in the memory 1012, and wherein the computer program, when loaded into and run by the processor 1011 is configured to cause the processor to execute method steps according to any of the methods described in any of the FIGS. 2-6.

The described embodiments herein enable simple authentication between a network provider and a multiple of users or communication devices tied to a communication device manager (i.e. a customer to the network provider) since the network provider does not have to identify each user when assigning a SIM to the communication device manager.

Hence the number of communication devices may be easily controlled and either increased or decreased by the communication device manager without involving the network provider. This leads to that applications for network systems may be designed without having to take into consideration the number of communication devices that may be using the application, e.g. by ensuring that a certain number of SIMs can be handled.

The described embodiments and their equivalents may be realized in software or hardware or a combination thereof.

They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming communication device.

According to some embodiments, a computer program product comprises a computer readable medium such as, for example, a diskette or a CD-ROM. The computer readable medium may have stored there on a computer program comprising program instructions. The computer program may be loadable into a data-processing unit, which may, for example, be comprised in a mobile terminal. When loaded into the data-processing unit, the computer program may be stored in a memory associated with or integral to the data-processing unit.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely for illustrative purpose and by no means limiting. Instead, all variations which fall within the range of the claims are intended to be embraced therein.

The invention claimed is:

1. A method, in an operator authentication server, for authentication of a communication device associated with a communication device manager, the communication device manager being associated with a plurality of communication devices, wherein the operator authentication server has transmitted group subscriber identity module (SIM) information to the communication device manager, wherein the group SIM information is associated with an international mobile subscriber identity (IMSI) number and a shared secret K, and wherein the communication device manager has transmitted a unique sub identifier and a unique derived secret Ki, but not the shared secret K, to each communication device, the method comprising:
  receiving, from the communication device, a request for authentication comprising the sub identifier associated with the communication device;
  determining whether the sub identifier is present in a sub identifier list;
  in response to determining that the sub identifier is known:
    deriving a secret Ki associated with the communication device based on the secret K shared with the communication device manager, and the sub identifier;
    transmitting a challenge to the communication device, wherein the challenge is formed cryptographically based on the derived secret Ki;
    receiving, from the communication device, a response to the challenge, wherein the response is cryptographically formed based on the derived secret Ki;
    determining whether the received response is correct by confirming that it was cryptographically formed by using the derived secret Ki; and
    in response to determining that the received response is correct, authenticating the communication device and deriving a first session key based on the derived secret Ki.

2. The method of claim 1, wherein the method further comprises:
  in response to determining that the sub identifier is stored in the sub identifier list, retrieving a sequence number associated with the stored sub identifier;
  in response to determining that the sub identifier is not stored in the sub identifier list:
    creating a new database entry for the sub identifier in the sub identifier list, wherein the new entry comprises the sub identifier and a sequence number; and
    setting the sequence number to an initial value.

3. The method of claim 1, wherein, following successful authentication of the communication device by the operator authentication server, a secondary authentication is performed between the communication device and a communication device manager authentication server, wherein the method further comprises:
  connecting to the communication device manager authentication server in order to enable the communication device manager authentication server to initiate the secondary authentication;
  transferring messages between the communication device and the communication device manager authentication server, wherein the messages are tunneled within an protection envelope provided by the successful authentication between the communication device and the operator authentication server; and
  receiving a notification from the communication device manager authentication server indicating successful secondary authentication or non-successful secondary authentication.

4. The method of claim 3, wherein the method further comprises, in response to receiving a notification indicating successful authentication:
  deriving a final session key by binding together the first session key and a second session key received in the notification; and
  determining the secondary authentication process to be successful.

5. A method, in a communication device, for authenticating the communication device by an operator authentication server, the communication device being associated with a communication device manager, the communication device manager being associated with a plurality of communication devices, wherein the communication device manager has received from the operator authentication server group subscriber identity module (SIM) information, wherein the group SIM information is associated with an international mobile subscriber identity (IMSI) number and a shared secret K, the method comprising:
  receiving a copy of the IMSI number associated with an instance of the group SIM information from the communication device manager;
  receiving a sub identifier from the communication device manager;
  receiving, from the communication device manager, a derived secret Ki, but not the shared secret K, the derived secret Ki being derived from the shared secret K and the sub identifier, wherein the sub identifier serves to identify the communication device, wherein the derived secret Ki serves to authenticate the communication device;
  transmitting a request for authentication to the operator authentication server, the request for authentication comprising the sub identifier associated with the communication device;
  receiving a challenge from the operator authentication server, wherein the challenge is formed cryptographically based on the derived secret Ki;
  transmitting a response to operator authentication server, wherein the response is formed cryptographically based on the derived secret Ki;
  deriving a first session key based on the derived secret Ki.

6. A method, in a communication device manager, for enabling authentication of a plurality of communication devices to an operator authentication server, the communication device manager being associated with the plurality of communication devices, wherein the communication device manager has received from the operator authentication server a group subscriber identity module (SIM) information, wherein the group SIM information is associated with an international mobile subscriber identity (IMSI) number and a shared secret K, the method comprising:
  creating an instance of the group SIM information for each of the plurality of communication devices;
  associating a respective copy of the IMSI number with each of the plurality of communication devices;
  assigning a respective sub identifier to each of the plurality of communication devices; and
  assigning a derived secret Ki, the derived secret Ki being derived from the shared secret K and the respective sub identifier, but not the shared secret K, to each of the plurality of communication devices, wherein the respective sub identifier serves to identify each of the plurality of communication devices, wherein the derived secret Ki serves to authenticate each of the plurality of communication devices.

7. An arrangement of an operator authentication server for authentication of a communication device associated with a communication device manager, the communication device manager being associated with a plurality of communication devices, wherein the operator authentication server has transmitted group subscriber identity module (SIM) information to the communication device manager, wherein the group SIM information is associated with an international mobile subscriber identity (IMSI) number and a shared secret K, and wherein the communication device manager has transmitted a unique sub identifier and a unique derived secret Ki, but not the shared secret K, to each communication device, wherein the arrangement comprises:
   processing circuitry;
   memory containing instructions executable by the processing circuitry whereby the arrangement is operative to cause:
      reception, from the communication device, a request for authentication comprising the sub identifier associated with the communication device;
      determination of whether the sub identifier is known;
      in response to determination that the sub identifier is known present in a sub identifier list;
         derivation of a secret Ki associated with the communication device based on the secret K shared with the communication device manager, and the sub identifier;
         transmission of a challenge to the communication device, wherein the challenge is formed cryptographically based on the derived secret Ki;
         reception, from the communication device, of a response to the challenge, wherein the response is cryptographically formed based on the derived secret Ki;
         determination of whether the received response is correct by confirming that it was cryptographically formed by using the derived secret Ki; and
         in response to determination that the received response is correct, authentication of the communication device and derivation of a first session key based on the derived secret Ki.

8. The arrangement of claim 7, wherein the instructions are such that the arrangement is operative to cause:
   in response to determination that the sub identifier is stored in the sub identifier list, retrieval of a sequence number associated with the stored sub identifier; and
   in response to determination that the sub identifier is not stored in the sub identifier list:
      creation of a new database entry for the sub identifier in the sub identifier list, wherein the new entry comprises the sub identifier and a sequence number; and
      setting the sequence number to an initial value.

9. The arrangement of claim 7, wherein the instructions are such that the arrangement is operative to cause:
   following successful authentication of the communication device by the operator authentication server, a secondary authentication to be performed between the communication device and a communication device manager authentication server;
   connection to the communication device manager authentication server in order to enable the communication device manager authentication server to initiate the secondary authentication;
   transferal of messages between the communication device and the communication device manager authentication server, wherein the messages are tunneled within an protection envelope provided by the successful authentication between the communication device and the operator authentication server; and
   reception of a notification from the communication device manager authentication server indicating successful secondary authentication or non-successful secondary authentication.

10. The arrangement of claim 9, wherein the instructions are such that the arrangement is operative to cause, in response to the received notification indicating successful authentication:
   derivation of a final session key by binding together of the first session key and a second session key comprised in the notification; and
   determination of the secondary authentication process to be successful.

\* \* \* \* \*